US009903954B1

(12) United States Patent
Farley

(10) Patent No.: US 9,903,954 B1
(45) Date of Patent: Feb. 27, 2018

(54) SYSTEMS AND METHODS FOR ABSOLUTE POSITION NAVIGATION USING PSEUDOLITES

(71) Applicant: Rockwell Collins, Inc., Cedar Rapids, IA (US)

(72) Inventor: Michael Greg Farley, Coggon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/136,544

(22) Filed: Apr. 22, 2016

Related U.S. Application Data

(60) Provisional application No. 62/316,472, filed on Mar. 31, 2016.

(51) Int. Cl.
| | |
|---|---|
| *H04W 24/00* | (2009.01) |
| *G01S 19/11* | (2010.01) |
| *H04B 7/185* | (2006.01) |
| *G01S 5/10* | (2006.01) |

(52) U.S. Cl.
CPC ............. *G01S 19/11* (2013.01); *G01S 5/10* (2013.01); *H04B 7/18513* (2013.01); *H04B 7/18515* (2013.01)

(58) Field of Classification Search
CPC ....... H04W 64/00; H04W 4/02; G01S 5/0252; G01S 5/02
USPC ......... 455/456.1, 456.2, 456.3, 456.4, 456.5, 455/456.6
See application file for complete search history.

(56) References Cited

U.S. PATENT DOCUMENTS

| | | | | |
|---|---|---|---|---|
| 6,101,178 | A * | 8/2000 | Beal ...................... | G01S 5/0027 342/357.31 |
| 6,590,524 | B1 | 7/2003 | Farley et al. | |
| 7,142,159 | B1 | 11/2006 | Farley | |
| 9,507,010 | B2 * | 11/2016 | Bani Hani ................ | G01S 5/02 |
| 2003/0198346 | A1 * | 10/2003 | Meifu .................... | G06Q 30/02 380/258 |
| 2008/0243316 | A1 * | 10/2008 | Sacle ....................... | G01C 5/06 701/9 |
| 2014/0163775 | A1 * | 6/2014 | Metzler ............... | G01C 15/002 701/2 |

(Continued)

*Primary Examiner* — Kathy Wang-Hurst
*Assistant Examiner* — Said Elnoubi
(74) *Attorney, Agent, or Firm* — Donna P. Suchy; Daniel M. Barbieri

(57) ABSTRACT

A pseudolite device for providing navigation data, while denied or having limited access to satellite navigation signals for instance, may include a receiver for receiving, from each of a plurality of pseudolites, respective navigation data including an indication of an absolute position of a respective pseudolite and a time instance at which the navigation data is transmitted by the respective pseudolite. The pseudolite device may include a processor configured to determine an absolute position of the pseudolite device according to the navigation data received from each of the plurality of pseudolites, and a transmitter for broadcasting positioning data and transmission time data. The positioning data can include an indication of the determined absolute position of the pseudolite device and the transmission time data includes an indication of a time instance at which the positioning data is transmitted by the transmitter.

20 Claims, 4 Drawing Sheets

(56) References Cited

U.S. PATENT DOCUMENTS

2014/0278075 A1\* 9/2014 Fink ..................... G01C 21/00
  701/468

\* cited by examiner

SYSTEMS AND METHODS FOR ABSOLUTE POSITION NAVIGATION USING PSEUDOLITES

RELATED APPLICATIONS

This application claims priority from U.S. Provisional Application No. 62/316,472, filed Mar. 31, 2016, and entitled "SYSTEMS AND METHODS FOR ABSOLUTE POSITION NAVIGATION USING PSEUDOLITES", which is incorporated herein by reference in its entirety

BACKGROUND

Global navigational satellite systems (GNSS) include the global positioning system (GPS) and the Russian global orbiting navigational satellite system (GLONASS). GNSS-based navigational systems are used for navigation and positioning applications. In the GPS navigational system, GPS receivers receive satellite positioning signals transmitted from a set of up to 32 satellites deployed in 12-hour orbits around the earth and dispersed in six orbital planes at an altitude of 10,900 nautical miles. Each GPS satellite continuously transmits two spread spectrum, L-band signals: an L1 signal having a frequency f1 of 1575.42 MHz, and an L2 signal having a frequency f2 of 1227.6 MHz. The L1 signal from each satellite is modulated by two pseudo-random codes, the coarse acquisition (C/A) code and the P-code. The P-code is usually encrypted, with the encrypted version of the P-code referred to as the Y-code. The L2 signal from each satellite is modulated by the Y-code. The C/A code is available for non-military uses, while the P-code (Y-code) is reserved for military uses.

A GPS receiver usually determines its position using the travel time of a coded radio GPS signal received from a particular satellite. The receiver can generate or maintain a set of codes identical to those codes (e.g., the Y-code or the C/A-code) transmitted by the satellite. The receiver can compute the travel time of the received coded radio GPS signal by determining a time shift between its own codes and the codes transmitted by the satellite. The receiver can multiply the computed travel time by the speed of light to determine the distance between the transmitting satellite and the receiver. The receiver can receive GPS signals from four or more satellites and determine how far it is from each of the satellites. Using its distance from the various satellites, the receiver can accurately determine its position in three dimensions (e.g., longitude, latitude, and altitude). A conventional GPS receiver typically utilizes the fourth satellite to accommodate a timing offset between the clocks in the receiver and the clocks in the satellites. The GPS signals also include a 50 bit per second data stream or data message which is superimposed on the C/A and Y-codes. Once the receiver has matched its code to the code in the GPS signal from a particular satellite, the receiver can decipher the data message. The data message can include navigational data related to the position of the satellite, including geometric dilution of precision (GDOP) parameters. Additionally, the data message can include accurate time data, ephemeris data, and data related to the health status of the satellite. The GPS satellites utilize code division multiple access techniques so satellite signals do not interfere with each other. GLONASS navigational systems operate similarly to GPS navigational systems and utilize frequency division multiple access (FDMA) techniques so satellite signals do not interfere with each other.

GNSS navigational systems have tremendous benefits over other positioning and navigational systems because these systems do not rely upon visual, magnetic or other points of reference. However, conventional GNSS navigational systems are susceptible to jamming or interference by other signals. When jammed by higher power signals, the C/A-code encoded signal becomes difficult to acquire. Typically C/A-code acquisition is necessary to acquire the Y-code signal. Therefore, in the presence of jamming or interfering signals, navigation using a GNSS receiver can become unreliable.

In some applications, such as a military battle field, pseudolites can be used to enhance GNSS performance when satellite signals undergo jamming, interference, or other phenomena rendering signal reception unreliable. For example, pseudolites transceivers that are away from a jamming environment can receive GPS signals from satellites, determine their positions based on the GPS signals received from the satellites, and generate and broadcast pseudolite positioning signals that can be received by GNSS receivers. Also, a stationary pseudolite can broadcast pseudolite positioning signals to GNSS receivers within a given distance from the stationary pseudolite. The pseudolite positioning signals can allow GNSS receivers that are unable to track the GNSS satellite signals (e.g., due to jamming or other reasons) to perform relative position navigation. In other words, the GNSS receivers in such a case can determine their positions with respect to the locations of the transmitting pseudolites.

SUMMARY

According to inventive concepts described herein, navigation systems and methods allow a constellation of pseudolites to provide reliable navigation data while denied satellite navigation data for a relatively long period (e.g., several hours or days). Each pseudolite can be configured to determine its absolute position using navigation data from a plurality of other pseudolites. Having a few reference pseudolites that can serve a subset of the pseudolites in the constellation with absolute navigation data allows the subset of pseudolites to self-navigate and serve other pseudolites in the constellation. As such, the number of self-navigating pseudolites in the constellation can grow to form a ranging network with respective coverage area that is substantially larger than a coverage area of the reference pseudolites.

In one aspect, the inventive concepts disclosed herein are directed to a pseudolite device that includes a receiver for receiving, from each of a plurality of pseudolites, first positioning data and first time data. The plurality of pseudolites may be associated with a pseudolite constellation. The first positioning data can include an indication of an absolute position of a respective pseudolite, and the first time data can include an indication of a time instance at which the first positioning data is transmitted by the respective pseudolite. The pseudolite device can include an atomic clock configured to provide a time associated with the pseudolite device, and a processor configured to determine an absolute position of the pseudolite device according to the first positioning data and the first time data received from each of the plurality of pseudolites, and the time provided by the atomic clock. The pseudolite device can include a transmitter for broadcasting second positioning data and second time data. The second positioning data can include an indication of the determined absolute position of the pseudolite device and the second time data can include an indication of a time instance, according to the atomic clock, at which the second positioning data is transmitted by the transmitter.

The plurality of pseudolites can include at least three pseudolites. The pseudolite constellation can include at least three stationary pseudolites. In some instances, the pseudolite device can also include an altimeter configured to determine the altitude of the pseudolite device. In such instances, determining the absolute position of the pseudolite device can include determining the absolute position according to the determined altitude of the pseudolite device. Also, in such instances, the plurality of pseudolites can include at least two pseudolites. The pseudolite constellation can include at least two stationary pseudolites.

The receiver can also be configured to receive third time data from one or more satellites, a communication network, and/or other time source. The processor can be configured to adjust a time value from the atomic clock using the received third time data. The absolute position of at least one of the plurality of pseudolites can be determined using positioning data and time data received from one or more other pseudolites. In some instances, the receiver can be configured to receive satellite positioning data and satellite time data. In such instances, the processor can be configured to check the integrity of the received satellite positioning data and satellite time data using the first positioning data and the first time data received from each of the plurality of pseudolites.

In some aspects, the inventive concepts disclosed herein are directed to a method for providing global positioning data that includes receiving, by a receiver of pseudolite device from each of a plurality of pseudolites associated with a pseudolite constellation, first positioning data and first time data. For each of the plurality of pseudolites, the first positioning data can include an indication of an absolute position of that pseudolite and the first time data can include an indication of a time instance at which the first positioning data is transmitted by that pseudolite. The method also includes providing, by an atomic clock of the pseudolite device, a time associated with the pseudolite device. A processor of the pseudolite device can determine an absolute position of the pseudolite device using the first positioning data and the first time data received from each of the plurality of pseudolites, and the time provided by the atomic clock. A transmitter of the pseudolite device can transmit second positioning data and second time data. The second positioning data can include an indication of the determined absolute position of the pseudolite device, and the second time data can include an indication of a time instance, according to the atomic clock, at which the second positioning data is transmitted by the transmitter.

The plurality of pseudolites can include at least three pseudolites, and the pseudolite constellation can include at least three stationary pseudolites. In some instances, the method can also include an altimeter of the pseudolite device determining the altitude of the pseudolite device. In such instances, determining the absolute position of the pseudolite device can include determining the absolute position according to the determined altitude of the pseudolite device. Also, in such instances, the plurality of pseudolites can include at least two pseudolites, and the pseudolite constellation can include at least two stationary pseudolites.

The receiver can receive third time data from a one or more satellites, a communication network, or other time source. The processor can adjust a time value of the atomic clock using the received third time data. The absolute position of at least one of the plurality of pseudolites can be determined using positioning data and time data received from one or more other pseudolites. The receiver can receive satellite positioning data and satellite time data, and the processor can check the integrity of the received satellite positioning data and satellite time data using the first positioning data and the first time data received from each of the plurality of pseudolites.

In certain aspects, the inventive concepts disclosed herein are directed to a pseudolite device that includes a receiver configured to receive from each of a plurality of pseudolites respective navigation data. For each pseudolite, the respective navigation data can include an indication of an absolute position of that pseudolite and a time instance at which the navigation data is transmitted by that pseudolite. The pseudolite device can include a processor configured to determine an absolute position of the pseudolite device according to the navigation data received from each of the plurality of pseudolites, and a transmitter configured to broadcast positioning data and transmission time data. The positioning data can include an indication of the determined absolute position of the pseudolite device and the transmission time data includes an indication of a time instance at which the positioning data is transmitted by the transmitter. In some implementations, the plurality of pseudolites can include at least four pseudolites.

BRIEF DESCRIPTION OF THE DRAWINGS

Embodiments of the inventive concepts disclosed herein will become more fully understood from the following detailed description, taken in conjunction with the accompanying drawings, wherein like reference numerals refer to like elements, in which.

Figure 1:
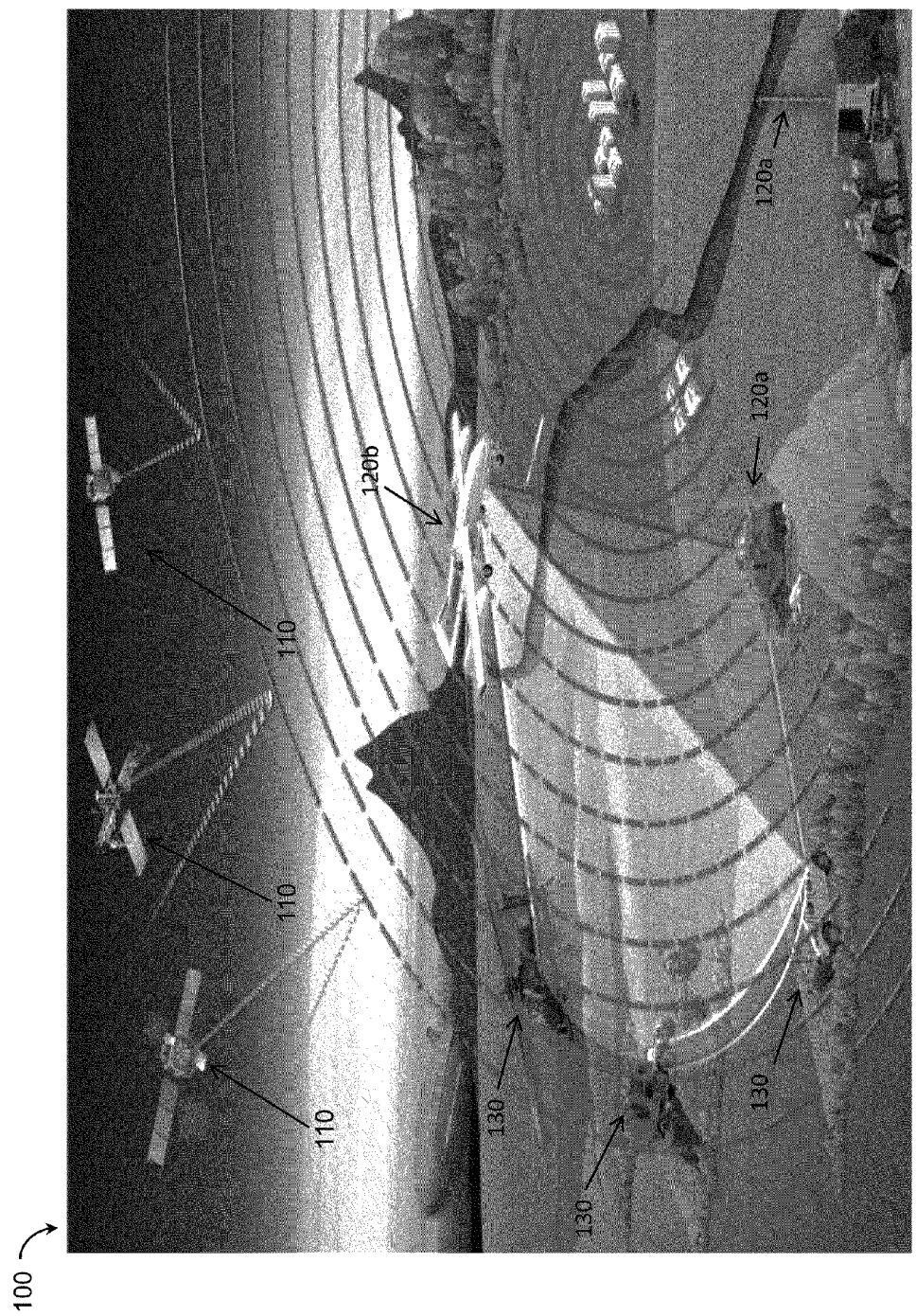
FIG. 1 shows a diagram illustrating a navigation system in accordance with some embodiments of the inventive concepts of this disclosure.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

FIG. 1 shows a diagram illustrating one embodiment of a navigation system 100 in accordance with inventive concepts of this disclosure. The navigation system 100 can include a plurality of satellites 110 and/or a plurality of pseudolites 120a and 120b (also referred to hereinafter individually or collectively as pseudolite(s) 120) serving a plurality of navigation user equipments (UEs) 130. The pseudolites 120 can include stationary pseudolites 120a and mobile pseudolites 120b. A navigation UE 130 can include a GNSS receiver, GLONASS receiver, or other type of navigation receiver capable of receiving satellite signals.

Each satellite 110 can include a respective stable atomic clock. Atomic clocks associated with various satellites are synchronized to each other and to ground clocks. The satellites 110 are configured to correct any time drift in their respective atomic clocks with respect to a maintained ground time (also referred to herein as the true ground time). Each satellite 110 continuously broadcasts satellite signals including data indicative of its current time and position. In some embodiments, satellite signals and data therein can be configured according to the Interface Specification IS-GPS-200 known to a person skilled in the art.

Navigation UEs 130 can include a GPS device, a hand-held GPS unit, a mobile device equipped with GPS capabilities, or any other device equipped with navigation capabilities. Navigation UEs 130 can include respective clocks. However, such clocks may not be synchronized with the true ground time and are less stable than atomic clocks. Each navigation UE 130 uses satellite signals received from multiple satellites 110 to determine its position and true time. In particular, each navigation UE 130 can determine its position using the position and timing information included in each received satellite signal as well as the relative time delays associated with the reception of such satellite signals. For example, each navigation UE 130 can use a Kalman filter to determine its position based on satellite time and position information received from a plurality of satellites 110.

Under some conditions, navigation UEs 130 can be denied (or unable to decode) satellite signals. For example, due to jamming, signal interference, or other signal-degrading conditions, satellite signals received by one or more navigation UEs 130 can be associated with low signal-to-noise ratio (SNR). Under such conditions, the navigation UE(s) 130 may not be able to reliably decode the navigation data in the received satellite signals, and, therefore, cannot use such navigation data to reliably determine its position.

The pseudolites 120 are electronic devices that are used to provide an alternative navigation system (such as an alternative GPS system), especially for navigation UEs 130 that are denied satellite signals. Pseudolites 120 can include stationary pseudolites 120a and/or mobile pseudolites 120b. Stationary pseudolites 120a have fixed locations that are either permanent or temporary in nature. For example, a stationary pseudolite 120 can be mounted on a fixed platform such as a radio transmission tower or a high altitude building, or can be mounted on a vehicle (such as a Humvee, truck, car, ship, boat, or any other vehicle) that is stationary at a respective location. Each stationary pseudolite 120a can include a navigation transmitter or a navigation transceiver configured to broadcast respective position information of that stationary pseudolite 120a. Since the positions of stationary pseudolites 120a are fixed, the stationary pseudolites 120a can continuously broadcast their absolute positions.

Mobile pseudolites 120b can include ground mobile pseudolites mounted on ground vehicles (such as Humvees, trucks, cars, or other ground vehicles), naval mobile pseudolites (e.g., mounted on submarines, ships, or other naval vessels), and/or airborne mobile pseudolites (e.g., mounted on aircrafts, helicopters, or other flying vehicles). Mobile pseudolites 120b include transceivers to receive satellite signals and broadcast navigation data. In particular, a mobile pseudolite 120b can use satellite signals to determine its position, and then broadcast information indicative of its position.

Pseudolites 120, in use, can increase anti jamming performance (or performance under signal interference/degradation conditions) of the navigation UEs 130. Stationary pseudolites 120a can broadcast their positions to navigation UEs 130 within range. Also, mobile pseudolites 120 can receive satellite navigation signals from the satellites 110, determine their locations according to navigation data in the received satellite navigation signals, and broadcast their positions to navigation UEs 130 within range. When a navigation UE 130 is denied satellite positioning signals, for example, due to jamming, signal interference, or other signal-degrading conditions, one or more pseudolites 120 can provide an alternative source of navigation data for that navigation UE 130. Accordingly, pseudolites 120 can improve the performance of the navigation UEs 130 under such undesirable conditions.

However, pseudolites 120 usually have relatively short broadcasting ranges compared to satellites 110. The transmit power and broadcasting range of each pseudolite 120 can depend on the power available to the transmitter or transceiver of that pseudolite 120. Also, mobile pseudolites 120b can be denied access to satellite signals. For example, in a battle field, satellite signals received by a mobile pseudolite 120b can be jammed rendering that mobile pseudolite 120b unable to reliably decode or access such signals, and, therefore, unable to determine its position. As such, when navigation UEs 130 are denied access to satellite positioning signals, mobile pseudolites 120b can provide only relative position navigation (but not absolute position navigation) when the mobile pseudolites 120b themselves are denied access to satellite positioning signals. In other words, when transmitting mobile pseudolites 120b are denied access to satellite positioning signals, navigation UEs 130 receiving navigation data from such mobile pseudolites 120b can only at best determine their relative locations with respect to the transmitting pseudolites, but not their absolute positions.

A navigation UE 130 denied satellite positioning signals can restore its navigation performance (i.e., determine its absolute position) if it is within a broadcasting range of a plurality of pseudolites 120 whose positioning capabilities are not undermined by jamming, signal interference or other signal-degrading conditions. However, where a navigation UE 130 is denied access to satellite positioning signals, for example, due to jamming in a military battlefield, mobile pseudolites 120b within a broadcasting range from that navigation UE may themselves be prone to such jamming, rendering their performance unreliable. Also, the number of stationary pseudolites 120a may be limited and the respective broadcasting range may not be broad enough to serve all navigation UEs 130 that may be denied satellite positioning signals. In such a situation, the pseudolites 120 may be ineffective in terms of providing an alternative source of navigation data.

The technical problem of providing reliable navigation for navigation UEs 130 that are denied access to satellite navigation signals has been the subject of study and development by government and industry. While solutions have emerged that are capable of providing accurate navigation for short periods of time (e.g., minutes), the quest for accurate long term capability (e.g., hours or days) in a self-contained system has proven more difficult. Perhaps one challenging objective of the pseudolites 120 is to maintain self-positioning accuracy with a reasonable error margin (e.g., within about 30 meters), and maintain a reasonable time accuracy (e.g., within about 100 ns) when access to GPS is denied for up to several hours or days. This objective applies to both air and ground platforms.

A wide range of technologies were applied to this problem space by industry, but each technology comes with a unique set of strengths and weaknesses. Self-contained solutions such as sensor fusion utilizing inertial measurement units (IMUs), wheel sensors, atomic clocks, and other sensors can provide highly trusted capability but the resulting navigation solution degrades quickly. External solutions such as radio ranging, network time transfer, and eLoran are capable of providing long term accuracy but require significant infrastructure to be in place and may be susceptible to jamming, spoofing, or cyber-attacks. Optical technologies such as georeferenced imaging, celestial, laser, and radar can provide beneficial measurements, but are susceptible to poor visibility due to weather or obscuration, and can create an electromagnetic signature. Each of these technologies is at a different technology readiness level (TRL), and the algorithms necessary to integrate these technologies continue to evolve as new technologies emerge.

According to inventive concepts of this disclosure, an improved pseudolite system is configured to allow a pseudolite constellation that is denied satellite signals to provide absolute navigation data to other pseudolites 120 and to navigation UEs 130. A pseudolites 120 in the pseudolite constellation can use navigation data received from other pseudolites 120 with known absolute positions to determine its absolute position, and broadcast pseudolite navigation data even when denied satellite positioning signals. According to an example embodiment, the pseudolite constellation can include a number of stationary pseudolites 120a that broadcast their absolute (fixed) positions. A mobile pseudolite 120b, in the constellation, that is within a broadcasting range from one or more of the stationary pseudolites 120 can receive navigation data from the one or more stationary pseudolites 120a, use the received navigation data to determine its absolute position, and broadcast its determined absolute position to other pseudolites 120 in the constellation and to navigation UEs 130. Once a first pseudolite 120 in the constellation knows its absolute position, a second pseudolite 120 in the constellation can use the navigation data broadcast by the first pseudolite 120 (e.g., with navigation data from other pseudolites 120 with known respective absolute positions) to determine its absolute position. Navigation data broadcast by the second pseudolite 120 can then be used by other pseudolites 120 to determine their absolute positions. Accordingly, the pseudolites 120 in the constellation with known absolute positions can form a pseudolite ranging network that can provide absolute navigation data to navigation UEs 130 even when such pseudolites are denied access to satellite navigation data, or only have limited access to satellite navigation data.

The creation of a pseudolite ranging network can extend the availability and integrity of the pseudolite service, for example, to a Brigade Combat Team (BCT), without employing additional infrastructure. The concept of operation for a pseudolite ranging network is based on the premise that each pseudolite 120 can individually determine its own absolute position, and broadcast its determined absolute position (or an indication thereof) to other pseudolites 120 and/or other navigation UEs 130. Under highly contested conditions (e.g., signal jamming, signal interference, or extreme weather conditions), if an individual pseudolite 120 is unable to self-navigate (e.g., unable to determine its absolute position), its ability to provide absolute navigation data to other pseudolites 120 or to navigation UEs 130 is compromised. When pseudolites 120 in the constellation are configured to transmit their absolute positions, a receiving pseudolite 120 or a navigation UE 130, that is denied satellite navigation signals, can employ absolute positioning data from four other pseudolites to determine its absolute position. If the receiving pseudolite 120 or the navigation UE 130 is within the broadcasting range of less than four pseudolites with known absolute positions, the capability of the receiving pseudolite 120 or the navigation UE 130 to self-navigate is compromised.

According to inventive concepts of the current disclosure, operation of the pseudolite service provided by a pseudolite constellation can be extended by leveraging the ability of pseudolites 120 to track other pseudolites 120 and work together as a pseudolite ranging network. In particular, given an initial number of self-navigating pseudolites (i.e., an initial number of pseudolites with known respective absolute positions), the pseudolite service provided by the constellation can extend beyond the broadcasting range of such initial number of self-navigating pseudolites as more and more pseudolites, in the constellation, determine their absolute positions using navigation data broadcast by the initial number of self-navigating pseudolites or other self-navigating pseudolites (e.g., pseudolites that already determined their absolute positions using navigation data from the initial number of self-navigating pseudolites). This network can operate to provide absolute navigation data, without employing additional infrastructure, even when satellite navigation data is unavailable to all pseudolites in the constellation for a relatively extended period of time (e.g., in the range of hours).

In the following, the term "reference pseudolite" is used to describe a pseudolite that is capable of self-navigating using any method except tracking other pseudolites. For example, a reference pseudolite can be a stationary pseudolite 120a, a pseudolite 120 that can determine its absolute position using satellite navigation data, or a pseudolite 120 that can determine its absolute position using other GPS denied navigation methods (e.g., wireless triangulation). A tactical relay tower (TRT) of a warfighter information network-tactical (Win-T) is a well suited candidate for a reference pseudolite. A mobile pseudolite 120b can also be used as a reference pseudolite if it is self-navigating or is stationary at a known location.

Figure 2:
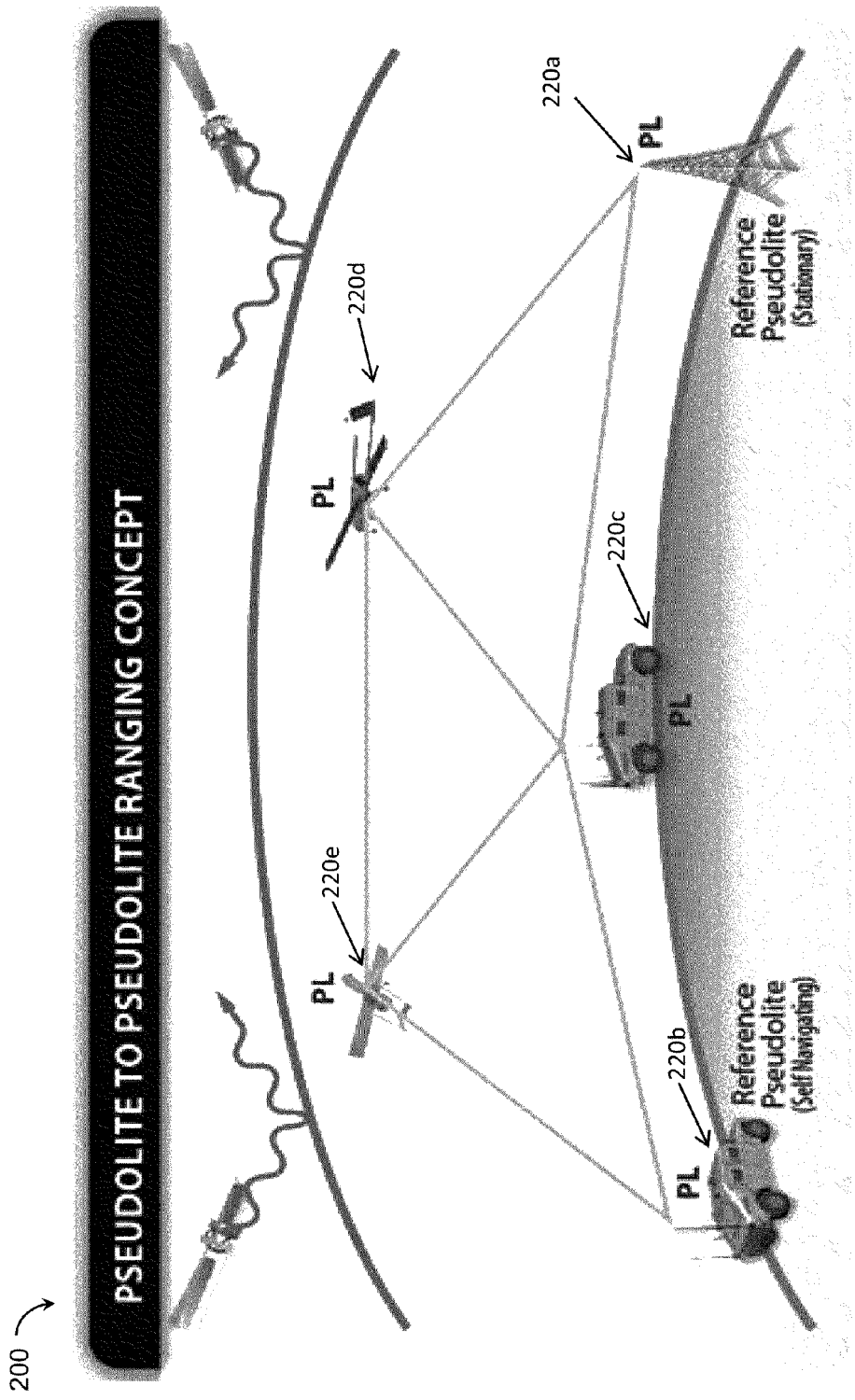
FIG. 2 shows a diagram of a pseudolite system in accordance with certain embodiments of the inventive concepts of the current disclosure.

FIG. 2 shows a diagram of one embodiment of a pseudolite constellation 200 in accordance with inventive concepts of the current disclosure. The pseudolite constellation 200 includes a plurality of reference pseudolites (e.g., pseudolites 220a and 220b) and a plurality of other non-reference pseudolites (e.g., pseudolites 220c, 220d, and 220e) that are configured to track other pseudolites. The reference pseudolites 220a and 220b can be stationary pseudolites. While FIG. 2 shows only two reference pseudolites 220a and 220b in the constellation 200, the minimum number of reference pseudolites in the pseudolite constellation 200 to allow for the pseudolite constellation 200 to operate as a ranging pseudolite network depends on the capabilities of each pseudolite and the type of navigation data transmitted by each pseudolite. For example, a pseudolite can determine its absolute position based on the absolute positions of four other pseudolites. A pseudolite can also determine its absolute position using the absolute positioning information and timing information (e.g., time instances of transmitting positioning information) of three other pseudolites. Also, a pseudolite capable of determining its altitude (e.g., using altimeters), can determine its absolute position using positioning information and timing information from two other pseudolites.

The pseudolites in the constellation 200 can be configured (or designed) to allow the pseudolite constellation 200, even when denied satellite navigation signals, to provide absolute navigation data to participating pseudolites in the constellation 200 as well as to navigation UEs. For example, each pseudolite in the constellation 200 can include an atomic clock and/or an altimeter. Also, non-reference pseudolite (e.g., 220c, 220d, and 220e) can be configured to use navigation data received from other pseudolites to determine their absolute positions. Once a pseudolite's absolute position is determined, that pseudolite can broadcast respective pseudolite navigation data, for instance, to one or more other pseudolites or to navigation UEs. The pseudolites in the constellation 200 can also use a respective atomic clocks to maintain and broadcast accurate timing data within respective navigation data.

Considering the constellation 200 in FIG. 2, the pseudolite 220c can determine its absolute position using navigation data received from the reference pseudolites 220a and 220b. Once it determines its absolute position, the pseudolite 220c can then broadcast respective navigation data that is indicative of its absolute position. The pseudolite 220d can determine its absolute position using navigation data broadcast by the reference pseudolite 220a and the pseudolite 220c. The pseudolite 220d can then broadcast its navigation data including indication(s) of its absolute position. The pseudolite 220e can determine its absolute position using navigation data received from the pseudolites 220b and 220c, or using the navigation data received from the pseudolites 220c and 220d. Each pseudolite that knows its absolute position can self-navigate. As the number of self-navigating pseudolites in the constellation 200 increases, the coverage area served with absolute navigation data extends way beyond the broadcasting area associated with the reference pseudolites 220a and 220b. While in the constellation configuration shown in FIG. 2, each pseudolite can determine its absolute position using navigation data from two other pseudolites, it is to be contemplated that according to another constellation configuration, each pseudolite can determine its absolute position using navigation data from three other pseudolites. In such constellation configuration, the pseudolite constellation includes three reference pseudolites (e.g., three stationary pseudolites). According to even another constellation configuration, each pseudolite can determine its absolute position using navigation data from four other pseudolites. In such constellation configuration, the pseudolite constellation includes reference pseudolites (e.g., four stationary pseudolites).

According to an example scenario, a plurality of pseudolites that are deployed over a given area where satellite navigation signals are denied, for example, due to jamming, signal interference, or extreme weather conditions. The pseudolite(s) over the given area that are within the broadcasting range of at least four reference pseudolites (such as four stationary pseudolites) can determine their absolute positions using received indications of the positions of the reference pseudolites. The combination of the pseudolites with determined absolute positions and the references pseudolites can then serve other pseudolites over the given area with absolute navigation data allowing the other pseudolites to self-navigate. If the reference pseudolites and the pseudolites over the given area are configured to broadcast positioning information and timing information (i.e., indications of transmission timing of the positioning information), three reference pseudolites (e.g., three stationary pseudolites) can be sufficient and each pseudolite can determine its absolute position using broadcasting data from three other pseudolites. If the pseudolites over the given area are equipped with atomic clocks and altimeters and can determine their altitudes using such altimeters, two reference pseudolites (e.g., two stationary pseudolites) can be sufficient and each pseudolite can determine its absolute position using broadcasting data from two other pseudolites. The pseudolites over the coverage area, can correct (or adjust) the timing maintained by the respective atomic clocks using time data from satellites (e.g., once they regain access to satellite navigation data), from communication networks (e.g., wireless networks), or from other radio transmitters.

Figure 3:
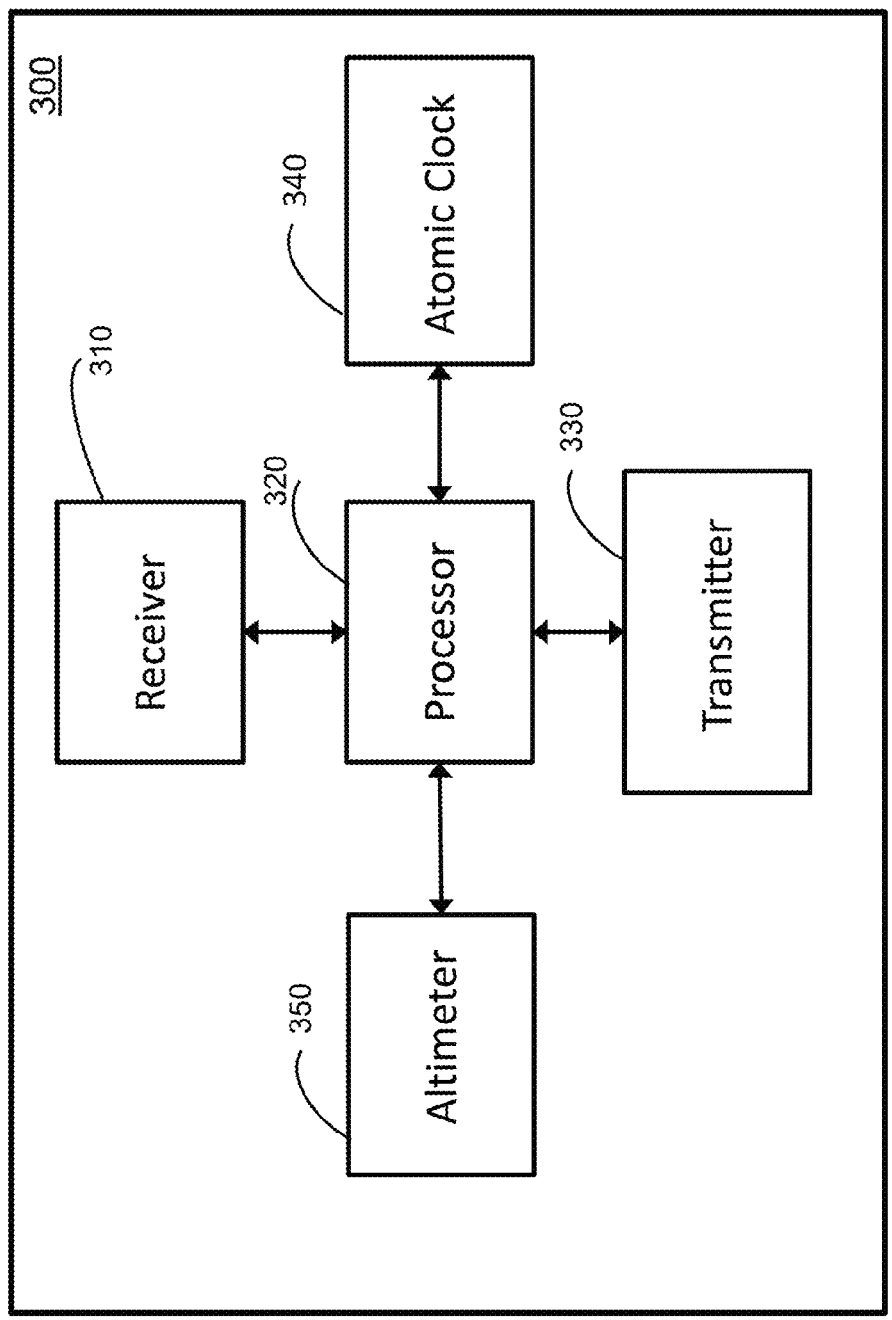
FIG. 3 is a block diagram of a pseudolite device in accordance with some embodiments of the inventive concepts of the current disclosure.

FIG. 3 is a block diagram of one embodiment of a pseudolite device 300 in accordance with inventive concepts of the current disclosure. The pseudolite device 300 can include a receiver 310, a processor 320, a transmitter 330, an atomic clock 340, and/or an altimeter 350. In some implementations, the atomic clock 340 and/or the altimeter 350 can be optional.

The receiver 310 can receive satellite positioning signals and/or pseudolite positioning signals. The receiver can receive satellite positioning signals and pseudolite positioning signals simultaneously, or can alternate between receiving satellite positioning signals and receiving pseudolite positioning signals. In some embodiments, the pseudolite positioning signals can be within the L1 and L2 frequency bands used by the GPS satellites. However, pseudolite positioning signals can be associated with spread spectrum codes different than those used by the satellites. The spread spectrum codes used by each pseudolite can be predefined (e.g., fixed and stored in a memory of the pseudolite 300), or can be received from a remote computing device (such as a computing device associated with a command center) via a communications network. In some embodiments, pseudolite navigation signals and data therein can be configured according to the Interface Specification IS-GPS-250 known to a person skilled in the art.

The processor 320 can use received satellite positioning data and/or received pseudolite positioning data to determine an absolute position of the pseudolite 300. The processor 320 can be configured to check the signal strength, the signal-to-noise ratio (SNR), and/or the integrity of received positioning signals and determine which positioning signals to be used to determine the position of the pseudolite 300. For example, the processor 320 can determine that the received satellite positioning signals are jammed and decide to determine the location of the pseudolite 300 using pseudolite positioning signals received from stationary pseudolites.

In some embodiments, the pseudolite 300 can receive pseudolite navigation data from at least four other self-navigating pseudolites, and the processor 320 can use the received pseudolite navigation data to determine the absolute location of the pseudolite 300. If the pseudolite 300 includes an atomic clock 340, the processor 320 can accurately determine the absolute position of the pseudolite 300 using the clock signal of the atomic clock and navigation data (positioning and timing data) from at least three other self-navigating pseudolites. If the pseudolite 300 includes an altimeter 350, the processor 320 can determine the absolute position of the pseudolite 300 using an estimated altitude provided by the altimeter 350 and navigation data from at least three other self-navigating pseudolites for example. If the pseudolite 300 includes an atomic clock 340 and altimeter 350, the processor 320 can determine the absolute position of the pseudolite 300 using the clock signal of the atomic clock, an estimated altitude provided by the altimeter 350, and navigation data from at least two other self-navigating pseudolites. Pseudolite navigation data from a given self-navigating pseudolite can include data indicative of the absolute location of that pseudolite and/or timing data indicative of the time at which the pseudolite navigation data was transmitted.

The processor 320 can be configured to use pseudolite navigation data received from reference pseudolites or self-navigating pseudolites to check the integrity of received satellite navigation data. The processor 320 can attribute more integrity or weight to navigation data received from trusted reference pseudolites and/or trusted self-navigating pseudolites than to navigation data received from satellites. The processor 320 can determine a first location of the pseudolite 300 using pseudolite navigation data from trusted reference pseudolites or trusted self-navigating pseudolites, determine a second location of the pseudolite 300 using satellite navigation data, and compare the determined first and second locations. If there is a discrepancy (e.g., beyond a given threshold) between the determined first and second locations, the processor 320 can flag the received satellite navigation data as unreliable, for instance. The processor can use a Kalman filter to determine the absolute position of the pseudolite 300 based on received navigation data.

Just as pseudolites can provide higher integrity (trusted) signals to navigation UEs, some pseudolites are able to provide higher integrity signals to other pseudolites. Mobile pseudolites, for example, may self-navigate with varying degrees of accuracy depending upon their mobility and proximity to jamming and spoofing threats. A stationary pseudolite is not susceptible to spoofing because it is in a known position. Also, an unmanned aircraft system (UAS) based pseudolite may have better line of sight access to the C2 data link which provides GPS data messages that can be used for resiliency. By leveraging the ability of pseudolites to track other pseudolites, data can be more reliably shared across a BCT, for example, and basic checks can be made against higher integrity pseudolite signals to detect and mitigate potential spoofing threats. According to an example embodiment, a single stationary reference pseudolite can ensure integrity of the pseudolite service to the entire BCT.

The atomic clock 340, such as a Chip Scale Atomic Clock (CSAC), can allow the processor 320 (or the pseudolite 300) to maintain accuracy during GPS outages of up to approximately one to two hours for instance. Atomic clocks are more accurate (compared to other clocks) because they have relatively smaller drifts that are usually statistically distributed around a center value. The processor 320 (or the Kalman filter) can use the clock signal of the atomic clock 340 together with received navigation data to determine the location of the pseudolite 300. For longer outages, the pseudolite 300 (or the processor 320) can be able to continue to maintain accuracy if an external source of accurate time is available such as via a communication network or radio time transfer.

It may be assumed that a stationary pseudolite mounted on a stationary platform knows its own location without the need to self-navigate. However a pseudolite may need to know accurate time/timing data for operation. Pseudolites (e.g., stationary or mobile pseudolites) can include respective receivers to receive satellite time data allowing such pseudolites to maintain and provide long term accurate time data, and could also be used for position initialization if satellite navigation data is accessible. In general, an atomic clock, such as CSAC, can allow a pseudolite to maintain time and position accuracy during satellite signal outages of up to approximately one to two hours, for instance. For outages longer than this the pseudolite would be able to continue operation providing accurate time and position information for instance, if an external source of accurate time is available such as via network or radio time transfer.

The altimeter 350 can determine an altitude or height of the pseudolite 300 (e.g., relative to sea level or another reference). The processor 320 can use the determined altitude to determine the location of the pseudolite 300. Using altitude estimates from the altimeter 350 can reduce the number of reference pseudolites being used by one.

The transmitter 330 can broadcast navigation data associated with the pseudolite 300 for use by other pseudolites or by navigation UEs within a broadcasting range from the pseudolite 300. The broadcasting range of the transmitter 330 depends on the power available to the transmitter 330. The navigation data associated with the pseudolite 300 can include an indication of the determined absolute position of the pseudolite 300. The navigation data associated with the pseudolite 300 can also include an indication of a time instance at which the navigation data is transmitted. In some embodiments, the transmitter 330 can transmit an indication of the reliability of the determined position of the pseudolite device 300.

Figure 4:
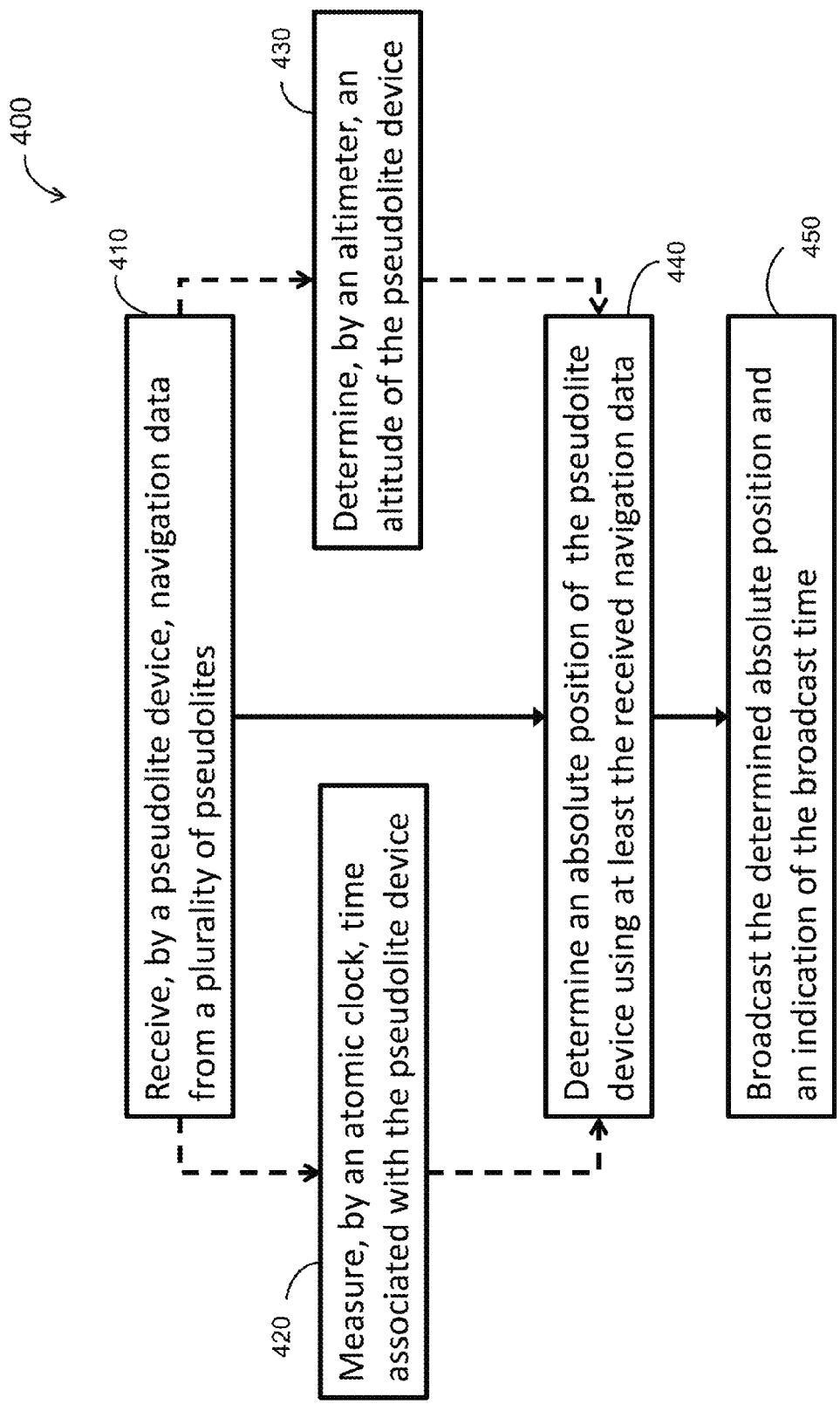
FIG. 4 shows a flowchart illustrating a navigation method performed by the navigation device.

FIG. 4 shows a flowchart illustrating a navigation method 400 performed by the pseudolite device 300. The navigation method 400 can include receiving navigation data from a plurality of pseudolites (step 410), measuring time associated with the pseudolite device 300 Step 420), determining an altitude of the pseudolite device (step 430), determining an absolute position of the pseudolite device using at least the received navigation data (step 440), and broadcasting an indication of the absolute position and a broadcast time associated with the broadcasting of the indication of the absolute position (step 430).

The method 400 can include a receiver of the pseudolite device 300 receiving navigation data from a plurality of pseudolites associated with a pseudolite constellation (step 410). The navigation data from each pseudolite can include the position of that pseudolite and a time instance at which the navigation data of that pseudolite was transmitted. As discussed above with respect to FIGS. 2 and 3, in some cases, the plurality of pseudolites can include at least four pseudolites. In such cases, the pseudolite constellation can include at least four reference pseudolites (e.g., at least four stationary pseudolites). In some implementations, at least one of the plurality of pseudolites is denied (or has no access to) satellite navigation data and the respective absolute position(s) is determined using navigation data (e.g., including positioning and time information) other pseudolites. In some instances, all of the plurality of pseudolites can be denied satellite navigation signals. In such instances, each of the plurality of pseudolites can determine its absolute position based on navigation data received from other pseudolites.

The method 400 can also include an atomic clock of the pseudolite device 300 measuring time associated with the pseudolite device 300 (step 420). The atomic clock can provide accurate time measurements at the pseudolite device, especially when the pseudolite device 300 is denied satellite navigation signals (e.g., due to jamming or other undesired conditions). During satellite coverage periods, the atomic clock can be synchronized (or re-synchronized) with the ground true time. The atomic clock exhibits relatively small drifting and can maintain a reasonable synchronization with the ground true time for about one to two hours while the pseudolite device is denied satellite navigation signals. In some implementations, the step 420 can be optional.

The method 400 can include an altimeter of the pseudolite device 300 determining an altitude of the pseudolite device 300 (step 430). Determining the altitude by the altimeter allows for determining of one of the variables defining the position of the pseudolites. As such, the position of the pseudolite device 300 can be determined using less data from external sources (such as satellites or pseudolites). In some implementations, the step 430 can be optional.

The method 400 can also include a processor of the pseudolite device 300 determining an absolute position of the pseudolite device based at least on the navigation data received from the plurality of pseudolites (step 440). For example, determining the absolute position of the pseudolite device 300 can include the processor executing a Kalman filter or other localization algorithms. In general, the processor can determine the absolute position of the pseudolite device 300 using the positions and the transmission times of the pseudolites from which the navigation data is received and the times of receiving the navigation data from the plurality of pseudolites. In some instances, the processor can also use time measured by the atomic clock in determining the absolute position of the pseudolite device. In such instances, the plurality of pseudolites can include at least three pseudolites since the processor can further use the atomic clock time in determining the absolute position of the pseudolite device 300. Also, the pseudolite constellation can include at least three reference pseudolites (e.g., at least three stationary pseudolites). Also, the processor can further use the altitude information determined by the altimeter in determining the absolute position of the pseudolite device 300. In cases where the processor uses the altitude information determined by the altimeter and time information provided by the atomic clock to determine the absolute position of the pseudolite device 300, the plurality of pseudolites can include at least two pseudolites and the pseudolite constellation can include at least two reference pseudolites (such as at least two stationary pseudolites).

In some implementations, the method can further include the receiver receiving time data from a communications network, one or more satellites, or a radio transmitter, and the processor adjusting the atomic clock or the time of the atomic clock according to the received third time data. For example, when the pseudolite device 300 regains access to satellite signals of an outage period, the receiver can receive satellite navigation data and the processor using time information in the received satellite navigation data to correct for any drifts in the atomic clock timing. In some instances, the timing data can be received from a wireless network or other time sources. Such timing data allows for the synchronization of the atomic clock with the ground true time. In some implementations, the method 400 can include receiving satellite navigation data, and the processor checking signal or data integrity of the received satellite navigation data using the navigation data received from the plurality of pseudolites. For example, the processor can identify the received satellite navigation data as non-trustworthy if it is inconsistent with the navigation data received from the plurality of pseudolites. Conversely, Satellite navigation data can be used to validate the integrity of the pseudolites signals, and other pseudolites signals can be used to validate the integrity of a particular pseudolites for instance.

The method 400 can include a transmitter of the pseudolite device 300 broadcasting an indication of the determined absolute position and a transmission time indicative of a time instance at which the indication of the determined absolute position is transmitted by the transmitter (step 450). Once the pseudolite device determines its absolute position based on the received navigation data from the plurality of pseudolites, it can serve other pseudolites or navigation UEs with absolute navigation data even if the pseudolite device is denied access to satellite navigation data.

The systems and methods described in this disclosure allow for providing navigation services in an area where access to satellite navigation data is denied due to jamming or other undesirable conditions. A pseudolite constellation can be formed by using pseudolite assets, for example, deployed in a battle field by a BCT. The pseudolite assets can be configured to exchange respective navigation data and, therefore, form a radio ranging network between the pseudolite assets themselves.

The construction and arrangement of the systems and methods are described herein as illustrative examples and are not to be construed or interpreted as limiting. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A mobile pseudolite device comprising:
   a receiver configured for receiving, from each of a plurality of pseudolites, first positioning data indicative of an absolute position of each of the respective pseudolites and first time data indicative of a time instance at which the first positioning data is transmitted by the respective pseudolites;
   an atomic clock configured for providing a time associated with the mobile pseudolite device;
   a processor coupled with the receiver and with the atomic clock and configured for determining an absolute position of the mobile pseudolite device according to the first positioning data, the first time data, and the time provided by the atomic clock; and
   a transmitter coupled with the processor and configured to extend an existing coverage area for accessibility to positioning signals by:
   broadcasting second positioning data indicative of the determined absolute position of the mobile pseudolite devices and second time data according to the atomic clock and indicative of a time instance at which the second positioning data is transmitted by the transmitter, the second positioning data and the second time data for use by a remote electronic device to determine a location of the remote electronic device.

2. The mobile pseudolite device of claim 1, wherein the plurality of pseudolites comprises at least three pseudolites.

3. The mobile pseudolite device of claim 1, wherein the plurality of pseudolites comprises a pseudolite constellation of at least three stationary pseudolites.

4. The mobile pseudolite device of claim 1, further comprising an altimeter configured for determining an altitude of the mobile pseudolite device, wherein determining an absolute position of the mobile pseudolite device includes determining the absolute position according to the determined altitude of the mobile pseudolite device.

5. The mobile pseudolite device of claim 4, wherein the plurality of pseudolites comprises at least two pseudolites.

6. The mobile pseudolite device of claim 1, wherein the receiver is configured to receive third time data and wherein the processor is configured to adjust the time of the atomic clock using the received third time data.

7. The mobile pseudolite device of claim 1, wherein an absolute position of a first pseudolite of the plurality of pseudolites is determined by the first pseudolite using positioning data and time data received from one or more other pseudolites.

8. The mobile pseudolite device of claim 1, wherein the receiver is further configured to receive satellite positioning data and satellite time data.

9. The mobile pseudolite device of claim 8, wherein the processor is configured to check an integrity of the received satellite positioning data and satellite time data using the first positioning data and the first time data received from each of the plurality of pseudolites.

10. The mobile pseudolite device of claim 8, wherein the processor is configured to check an integrity of at least one of the first positioning data or the second positioning data, using the received satellite positioning data and satellite time data.

11. A method for providing global positioning data comprising:
receiving, by a receiver of a mobile pseudolite device from each of a plurality of pseudolites, first positioning data indicative of an absolute position of the respective pseudolite and first time data indicative of a time instance of transmitting the first positioning data by the respective pseudolite;
providing, by an atomic clock of the mobile pseudolite device, a time associated with the mobile pseudolite device;
determining, by a processor of the mobile pseudolite device coupled with the receiver and with the atomic clock, an absolute position of the mobile pseudolite device using the first positioning data, the first time data, and the time maintained by the atomic clock; and
broadcasting, by a transmitter of the mobile pseudolite device coupled with the processor, second positioning data indicative of the determined absolute position of the mobile pseudolite device, and second time data according to the atomic clock and indicative of a time instance at which the second positioning data is transmitted by the transmitter, the broadcasting of the second positioning data and the second time data to extend an existing coverage area for accessibility to positioning signals, the second positioning data and the second time data for use by a remote electronic device to determine a location of the remote electronic device.

12. The method of claim 11, wherein the plurality of pseudolites comprises at least three pseudolites.

13. The method of claim 11, further comprises determining, by an altimeter of the mobile pseudolite device, an altitude of the mobile pseudolite device, wherein determining an absolute position of the mobile pseudolite device includes determining the absolute position according to the determined altitude of the mobile pseudolite device.

14. The method of claim 11, wherein the plurality of pseudolites comprises at least two pseudolites.

15. The method of claim 11, wherein the plurality of pseudolites comprises a pseudolite constellation of at least two stationary pseudolites.

16. The method of claim 11, further comprising:
receiving, by the receiver of the mobile pseudolite device, third time data; and
adjusting, by the processor of the mobile pseudolite device, the time of the atomic clock using the received third time data.

17. The method of claim 11, further comprising:
receiving, by the receiver of the mobile pseudolite device, satellite positioning data and satellite time data; and
checking, by the processor of the mobile pseudolite device, an integrity of the received satellite positioning data and satellite time data using the first positioning data and the first time data received from each of the plurality of pseudolites.

18. The method of claim 11, further comprising:
receiving, by the receiver of the mobile pseudolite device, satellite positioning data and satellite time data; and
checking, by the processor of the mobile pseudolite device using the received satellite positioning data and satellite time data, an integrity of at least one of the first positioning data or the second positioning data.

19. A mobile pseudolite device comprising:
a receiver configured for receiving, from each of a plurality of pseudolites, navigation data including an indication of an absolute position of the respective pseudolite and transmission time data indicative of a time instance at which the navigation data is transmitted by the respective pseudolite;
a processor coupled with the receiver and configured for determining an absolute position of the pseudolite device according to the navigation data received from each of the plurality of pseudolites; and
a transmitter coupled with the processor and configured to extend an existing coverage area for accessibility to positioning signals by:
broadcasting positioning data indicative of the determined absolute position of the mobile pseudolite device, and an indication of a broadcasting time for the positioning data, the positioning data and the broadcasting time for use by a remote electronic device to determine a location of the remote electronic device.

20. The pseudolite device of claim 19, wherein the plurality of pseudolites comprises at least four pseudolites.

* * * * *